United States Patent [19]

Kawas Kaleh

[11] Patent Number: 5,436,929
[45] Date of Patent: Jul. 25, 1995

[54] DECISION FEEDBACK EQUALIZER DEVICE AND METHOD FOR THE BLOCK TRANSMISSION OF INFORMATION SYMBOLS

[75] Inventor: Ghassan Kawas Kaleh, Paris, France

[73] Assignee: France Telecom, Paris, France

[21] Appl. No.: 73,414

[22] Filed: Jun. 9, 1993

[30] Foreign Application Priority Data

Jun. 26, 1992 [FR] France .................. 92 07917

[51] Int. Cl.$^6$ .................. H03H 7/30; H03H 7/40; H03K 5/159
[52] U.S. Cl. .................. 375/233; 371/43; 371/37.1; 364/724.2; 375/261; 375/340; 375/348; 375/349
[58] Field of Search .................. 375/14, 39, 94, 96, 375/99, 101, 102, 103; 371/43, 37.1; 364/724.2; 333/18, 28 R

[56] References Cited

U.S. PATENT DOCUMENTS

| | | | |
|---|---|---|---|
| 4,644,562 | 2/1987 | Kavehrad et al. | 375/101 |
| 4,862,481 | 8/1989 | Dzung | 375/94 |
| 4,905,254 | 2/1990 | Bergmans | 375/94 |
| 5,031,195 | 7/1991 | Chevillat et al. | 375/99 |

OTHER PUBLICATIONS

39th IEEE Vehicular Technology Conference 1-3/5/1989, San Francisco, US; IEEE New York, 1989; pp. 142–146, Croier et al.: "Short block equalization techniques employing channel estimation for facing time-dispersive channels".

IEEE Global Telecommunications Conference 1990; 2–5/12/1990, San Diego, US; IEEE, New York, US, 1990; pp. 1188–1195, Zervos: "High-speed carrierless passband transmission over the local cable network".

Electronics Letters, vol. 27, No. 13, Jun. 1991, Enage GB, pp. 1180–1182 Liu 'New Low-complexity decision feedback equalization technique for narrowband digital cellular systems'.

IEEE Global Telecommunications conference 1982, 29/11–2/12/1982, Miami, US; IEEE, New York, US, 1982; pp. 686–690, Urkowitz: "Synthesis of multiple processes based upon a Cholesky decomposition".

Primary Examiner—Stephen Chin
Assistant Examiner—Amanda T. Le
Attorney, Agent, or Firm—Larson & Taylor

[57] ABSTRACT

A decision feedback equalizer device and method for the block transmission of information symbols in which the received noise-affected observation samples are subjected to a whitening of the noise so as to generate whitened-noise observation samples. The current symbol is detected from earlier decided symbols and whitened-noise observation samples. Block transmission of information symbols can thus be performed over a distorting channel in an atmospheric, ionospheric or other environment towards fixed or mobile receivers.

6 Claims, 4 Drawing Sheets

FIG.1a. BLOCK STRUCTURE
PRIOR ART

FIG.1b. BASEBAND MODEL
PRIOR ART

DECISION FEEDBACK EQUALIZER DEVICE AND METHOD FOR THE BLOCK TRANSMISSION OF INFORMATION SYMBOLS

FIELD OF THE INVENTION

The present invention relates to a decision feedback equaliser device and method for the block transmission of information symbols transmitted over a variable distorting channel.

BACKGROUND OF THE INVENTION

The block transmission of information symbols through a distorting channel rapidly variable over time, such as a frequency-selective fading radio-frequency channel, imposes severe constraints at the receiving end, so as to allow suitable reception and suitable decoding of these symbols thus transmitted. Information symbols are understood as any signal consisting either of the values of logic variables or the values of digitised analogue variables.

In particular, reception can only be performed in the presence of inter-symbol interference. Such a system for block transmission has been described in the article by F. Hsu, entitled "Data Directed Estimation Techniques for Single-Tone HF Modems", IEEE Military Commun. Conf., Boston, Mass., Oct. 1985, pp. 12.4.1-10. This system has been recognised as appropriate and has been adopted in the standards describing and fixing the technical characteristics of modems for the (HF) ionospheric channel and may also be suitable in systems for communicating with mobiles.

Figure 1A:
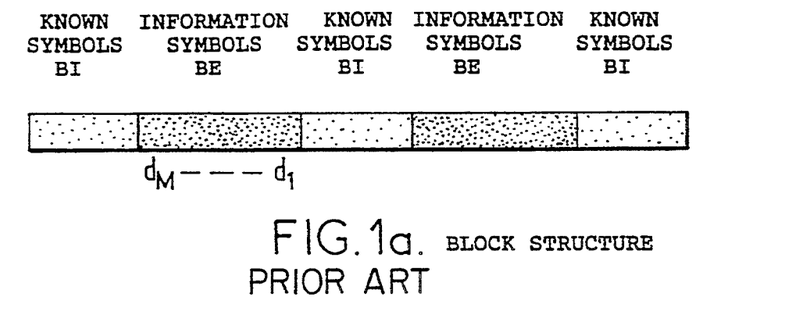

By way of illustration, it is recalled that this system for block transmission is based on the assumption by which the transmission channel is constant, in its physical or radio-frequency characteristics, during the transmission of a sufficiently short symbol block. Estimation of the channel, or of the physical or radio-frequency parameters of the latter, which estimation is required for the processing performed at the receiving end, is obtained by virtue of the transmission of known symbols, in the form of blocks BI interleaved between the information symbol blocks, BE, as illustrated in FIG. 1a. These known symbol blocks BI also have the role of subtracting their interference from the processed signal and of thus separating the symbol blocks BE so that each block of successive symbols may be processed independently of the adjacent blocks. Such a measure implies that the number of symbols of a known block is not less than the duration of the impulse response of the channel, expressed in number of symbols, more commonly designated the channel memory. A corresponding appropriate receiver is also described in the aforesaid article and is designated the "Nonlinear Decision-Directed Estimator" or NDDE. This type of receiver in fact requires the solution of M/2 systems of equations of decreasing dimensions, M/2, ..., 2, for symbol blocks containing M symbols.

Figure 1B:
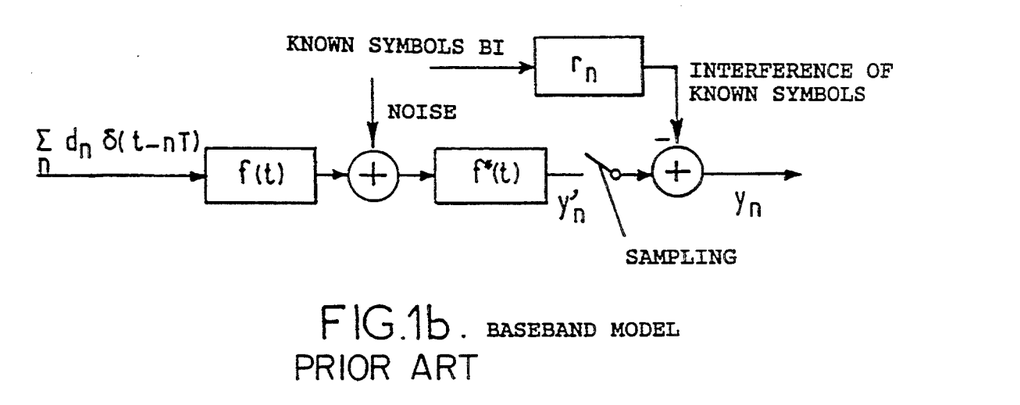

FIG. 1b shows a part of a baseband equivalent model of such a communication system. The symbols dn, in complex notation, are independent and identically distributed, and take equiprobable values in a finite alphabet of symbols. The symbols modulate the amplitude of a finite energy pulse f(t) with support [0,LT] where T represents the duration which separates the despatching of two consecutive symbols. The noise generated during transmission is centred, Gaussian noise with power spectral density $2N_0$.

Reception begins with optimal matched filtering f*(-t), the asterisk "*" designating the complex conjugate, followed by sampling, at the symbol rate. Assuming that the channel, that is to say its physical and radio-frequency parameters, is constant during the observation of a symbol block and that a perfect estimate of f(t) is then available at the receiver, a numerical implementation of the matched filtering can be carried out. The output from the matched filter sampled at the instants nT is then written:

$$y'n = \sum_{k=-L}^{L} rk \cdot dn - k + uk \text{ with } n = 1,2,\ldots,M$$

a relation in which {rk} designates the samples at the instants kT of the impulse response of the cascade consisting of the finite energy pulse f(t) and of the matched filter f*(-t). Note the Hermitian symmetry r-k=rk*. The samples uk, consisting in fact of the contribution due to the noise during the sampling at the receiving end, are the realisations of centred Gaussian random variables with auto-correlation function $$E(un.un-k^*)=2N_0.rk$$

In such a system for block transmission, the interference of the known symbols dn of an interleaf block BI, with n>M and n<1, which neighbour a symbol block BE composed of symbols dn with n∈[1,M] is subtracted from the sample y'n obtained at the output of the matched filter, thus making it possible to obtain an observation vector $$y=(y_M, y_{M-1},\ldots, y_1)^t$$

which does not depend on the known samples but on the following symbol vector $$D=(d_M, d_{M-1},\ldots, d_1)^t$$

where t designates the transposition operator. Every observation vector Y satisfies the relation:

$$Y=R.D+U$$

a relation in which R is a Toeplitz matrix of dimension M×M, with Hermitian symmetry and with elements $$R_{ij}=rj-1 \text{ with } i,j=0,1,\ldots,M-1.$$

U is a realisation of a centred Gaussian vector with covariance matrix $2N_0.R$.

The receivers of this type, designated NDDE receivers, make it possible to obtain, from the vector Y, a reliable decision regarding the despatched symbol vector D. However, this type of receiver necessitates the solution of M/2 systems of equations of decreasing dimensions M/2,M/2, ..., 2 where M, the number of symbols per block, is assumed to be even.

Finally, equalisers designated DFE equalisers, Decision Feedback Equalisers, are normally adapted for continuous transmission. Their use for block transmission is therefore less efficacious.

SUMMARY OF THE INVENTION

The aim of the present invention is to remedy the aforesaid disadvantages of the prior-art receivers.

In particular, an objective of the present invention is the implementation of a decision feedback equaliser device and method for the block transmission of information symbols in which the complexity, defined as the number of elementary calculating operations expended in order to obtain a decision, is reduced in a ratio of the order of M/6 by comparison with the prior-art device and method.

Another objective of the present invention is also the implementation of a decision feedback equaliser device and method for the block transmission of information symbols in which the signal-to-noise ratio is substantially improved.

The decision feedback equaliser method for the block transmission of information symbols over a variable distorting channel, the transmission being performed in data symbol blocks interleaved with reference symbol blocks and the detection of these symbols being performed, at the receiving end, from an observation vector which is the subject of the present invention, is notable in that it consists in performing, at the receiving end, in succession, a whitening of the noise affecting the received observation samples, in order to generate successive whitened-noise observation samples, a detection of the current symbol on the basis of the detections of the earlier decided symbols, from the said whitened-noise observation samples.

The decision feedback equaliser device for the block transmission of information symbols over a variable distorting channel, the transmission of the symbols being performed in the form of data blocks, containing M information symbols, interleaved with blocks of N reference symbols, the detection of the information symbols being performed from an observation vector $Y=(Y_M, Y_{M-1}, \ldots, Y_i, Y_1)^t$ formed from observation samples $y_i$ obtained at the receiving end, which is the subject of the present invention, is notable in that it includes a circuit for whitening the noise affecting these received observation samples, $y_i$, and making it possible to deliver based on a Cholesky decomposition successive whitened-noise observation samples $z_i$ of rank i, multiplier circuits receiving, on the one hand, the whitened-noise observation samples $z_i$, and, on the other hand, a multiplier coefficient $1/\sigma_{M-i}$, representing the element M-i of the matrix $\Sigma$ of the Cholesky decomposition, these multiplier circuits delivering the product $p_i = z_i/\sigma_{M-1}$, subtracter circuits receiving, on the one hand, the product pi and, on the other hand, a signal $q_i$, the sum of all the earlier decided information symbols $d_{i-q}$ with $q\epsilon[1, L']$, L' being at most equal to L, the duration of the memory of the channel in number of transmitted symbols, weighted by the corresponding element $H_{M-1, M-i+q}$ of the matrix H of the Cholesky decomposition, the said subtracter circuits delivering a decision signal $s_i$, a threshold-comparator circuit receiving the decision signal $s_i$ and delivering the decided information symbols signal , a feedback loop receiving the decided information symbols signal comprising, on the one hand, a circuit weighting the earlier decided information symbols signals to by the corresponding elements $H_{M-i, Mi+q}$ and, on the other hand, a circuit summing the products $H_{M-i, M-i+q} \cdot$ , with $q\epsilon[1, L']$, the summing circuit delivering the signal $q_i$ at the subtraction input of the subtractor circuits.

The decision feedback equaliser device and method for the block transmission of information symbols which are the subject of the invention find application in the field of telecommunications or teletransmission of digital information between mobile ionospheric or fixed transmitters and receivers, in an atmospheric, ionospheric or other environment.

BRIEF DESCRIPTION OF THE DRAWINGS

A more detailed description of the decision feedback equaliser device and method for the block transmission of information symbols which are the subject of the present invention will be given in the description and in the drawings below in which, apart from FIGS. 1a and 1b relating to known prior-art elements.

DETAILED DESCRIPTION OF THE PREFERRED EMBODIMENTS

A more detailed description of the decision feedback equaliser method for the block transmission of information symbols, which is the subject of the present invention, will now be given in connection with FIGS. 2a–2c.

Generally, in accordance with the method which is the subject of the present invention, the information symbols are transmitted over a variable distorting channel, as mentioned earlier in the description. The reception of the transmitted symbols is performed in the presence of noise inherent in the transmission itself and of inter-symbol interference.

Figure 2A:
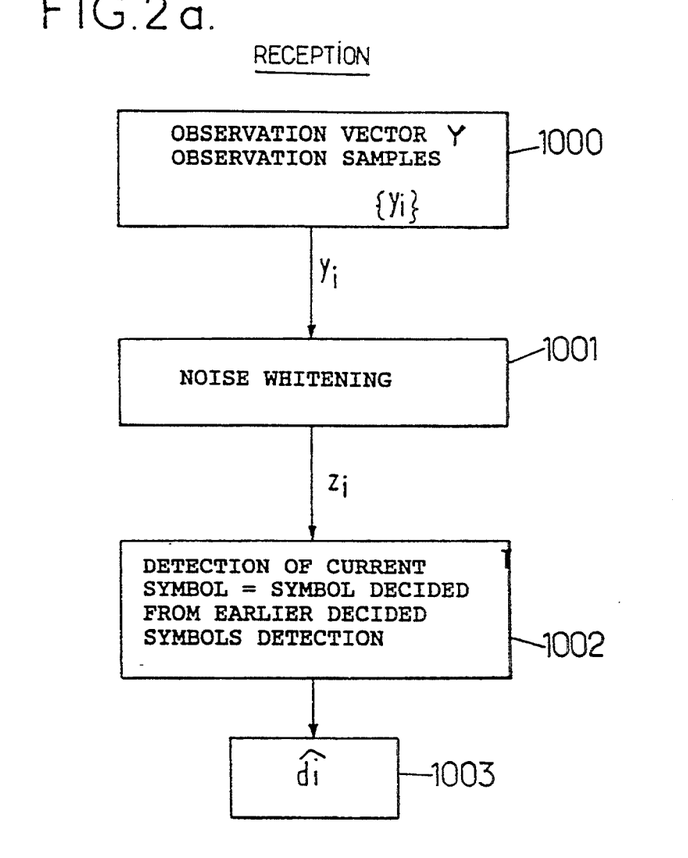
FIG. 2a represents a flow diagram illustrating the implementation of the method of the present invention.

At the receiving end, the detection of these symbols is performed, as represented in FIG. 2a schematically, from an observation vector, denoted Y, this observation vector being formed from observation samples $y_i$. It is of course understood that the observation vector Y, and in particular each of its components $y_i$ formed by the observation samples, is hence the seat not only of the aforesaid noise, but of the previously mentioned inter-symbol interference phenomenon. The step for constructing the observation vector Y formed from the observation samples $y_i$ is denoted 1000 in FIG. 2a.

In accordance with a particularly advantageous characteristic of the method which is the subject of the present invention, the latter then consists, as represented in the aforesaid figure, in performing successively, at the receiving end, a step, denoted 1001, for whitening the noise affecting observation samples received, so as to generate the successive whitened-noise observation samples, these samples being denoted $z_i$.

The aforesaid step 1001 is then followed by a step denoted 1002 consisting in performing a detection of the current symbol on the basis of the detections of the earlier decided symbols from the whitened-noise observation samples $z_i$. It is thus understood that in a step 1003, the decided symbol, denoted , is available, which is of course representative of the current symbol sought.

It will in particular be noted that the method which is the subject of the present invention is made possible by virtue of the effect below, which may be attributed to the succession of the two previously mentioned steps 1001 and 1002:

the reduction of the power of the whitened noise and,
the fact of making any decision regarding a present decided symbol causal in regard to the earlier decisions alone, or to a plurality of the latter, the samples of the noise then being effectively mutually decorrelated.

It will then be noted that step 1002 for detecting the current symbol from the detection of the earlier decided symbols amounts to making a decision by recursivity, using the earlier decisions or a plurality of them.

Generally, it is regarded that the noise-whitening operation can be carried out in a known manner, provided however that this operation makes it possible to obtain a sufficient decorrelation of the successive noise values, the noise affecting each whitened-noise sample $z_i$ then being regardable effectively as white noise.

However, given the essentially digital nature of the processing performed, in accordance with the method which is the subject of the present invention, a particularly advantageous embodiment of the noise-whitening operation will be given in connection with FIGS. 2b and 2c.

According to this embodiment, the noise-whitening operation can be performed by means of a Cholesky decomposition, thus making it possible next to make the decision regarding the current symbol by using one or more earlier decided symbols, in order to generate a decided symbol representative of the current symbol sought.

More specifically, it is regarded that the Cholesky decomposition is formulated from the expression for the noise U covariance matrix R of the transmission channel in the form:

$$R = H^{*t} \Sigma^2 . H$$

In this relation, H is a triangular matrix, the elements of the main diagonal of which are equal to one, the expression "$t$" indicating transposition and "$*$" the conjugate matrix. It will be noted that a lower or upper triangular matrix can be used, the causal character of the decisions regarding a present decided symbol with regard to the earlier decisions, when using an upper matrix, being made anti-causal with regard to the later decisions, when using a lower triangular matrix.

Figure 2B:
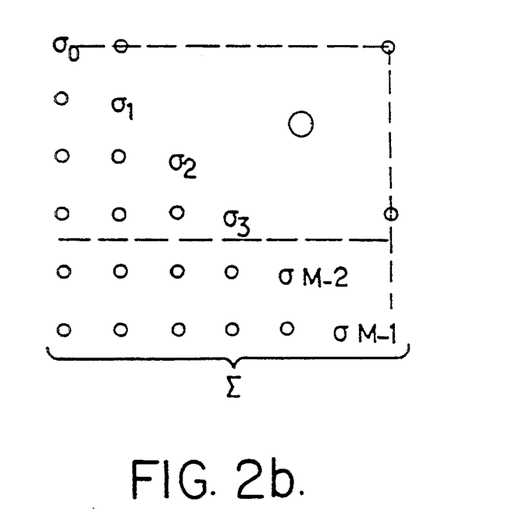
FIGS. 2b and 2c represent certain component elements of the steps of the method which is the subject of the present invention such as represented in FIG. 2a, FIG. 3 represents a circuit diagram of a decision feedback equaliser device for the block transmission of information symbols, which is the subject of the present invention.

Furthermore, $\Sigma$, shown in FIG. 2b is a diagonal matrix of positive real elements $\Sigma_{ii} = \sigma_i, \sigma_i^2$ representing the mean power of the prediction error obtained from a predictor of order i, with $i \in [0, \ldots, M-1]$. It is recalled that M designates the number of information symbols contained in a data block BE.

Figure 2C:
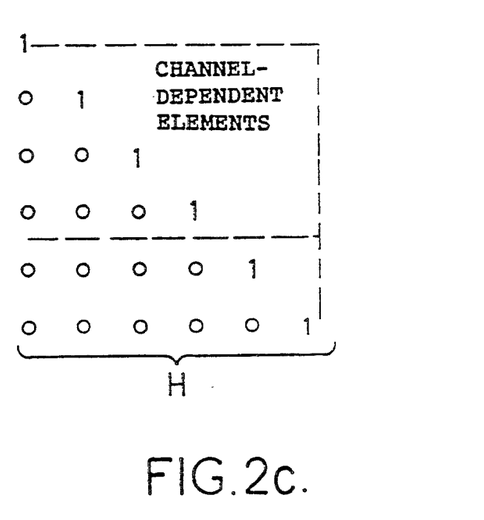

By the structure of the transformation effected by the matrix H, shown in FIG. 2c, this transformation is causal, each sample or whitened noise being expressible in the form:

$$Z = \epsilon.H.D + V$$

In this relation, it is noted that Z represents the vector of the whitened-noise samples $z_i$, z and H represent the previously mentioned matrices,
D represents the vector of the received symbols, with the relation:

$$Y = R.D + U$$

Thus, the vector Z of whitened-noise samples $z_i$ satisfies the relation:

$$Z = [H^{*t}.\Sigma]^{-1}.Y$$

The determination of the coefficients of the aforesaid matrices can be performed by implementation of the Schur algorithm.

Thus, for an M×M matrix with covariance R for the noise of the transmission channel containing elements $R_{ij} = r_{j-i}$ with $i,j = 0,1, \ldots, M-i$, the Cholesky decomposition linking the aforesaid covariance matrix with the previously mentioned matrices H and $\Sigma$ can be carried out in the manner below from an upper triangular matrix $B = \Sigma^2 H$ and from an auxiliary matrix C.

Obtaining the matrix B of course implies obtaining the matrix $\Sigma^2 = \text{diag}(B)$.

The matrix B is obtained from the Schur algorithm in the manner below:

$$B_{0,0} = r_0,$$

then for $j = 1, L: B_{0,j} = C_{0,j} = r_j$
for $i = 1, 2, M-1: r_i = -C_{i-1,i}/B_{i-1,i-1}$
for $j = i, i+1, \ldots, \min(i+L, M-1)$, where min represents the minimum value of the two arguments, $$C_{i,j} = C_{i-1,j} + \Gamma_i B_{i-1,j-1}$$

$$B_{i,j} = B_{i-1,j-1} + \Gamma_i^* C_{i-1,j}$$

It will be noted that $C_{i,j} = 0$ for $i = 0,1, M-1$.

A more detailed description of the decision feedback equaliser device for the block transmission of information symbols which is the subject of the present invention will now be given in connection with FIG. 3 and succeeding figures.

With the transmission of the information symbols being performed in the form of data blocks, containing M information symbols, as described previously in the description, the detection of the symbols is performed from an observation vector $Y = (Y_M, Y_{M-1}, \ldots Y_i, \ldots Y_1)^t$ formed from observation samples $Y_i$ obtained at the receiving end, that is to say after matched filtering and sampling, as represented in FIG. 1b, relating to the baseband model of the prior art.

Figure 3:
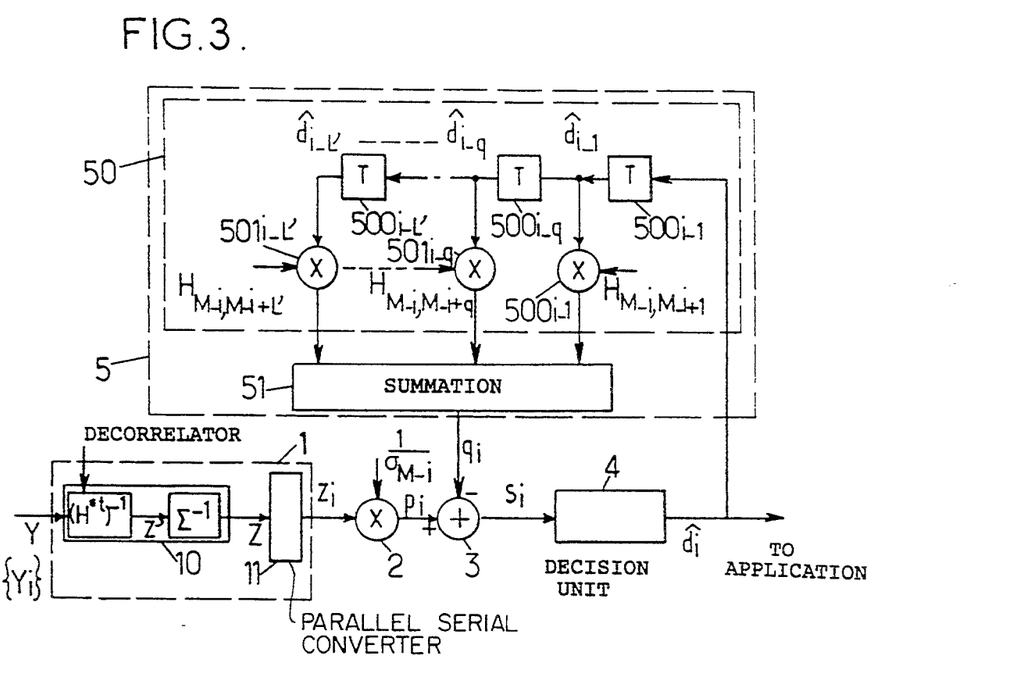

Thus as will be observed in FIG. 3, the equaliser device which is the subject of the present invention includes circuits 1 for whitening the noise affecting the said received observation samples, $Y_i$, and making it possible to deliver by Cholesky decomposition successive whitened-noise observation samples $z_i$ of rank i.

Furthermore, multiplier circuits 2 are provided, which receive, on the one hand, the whitened-noise observation samples $z_i$, and, on the other hand, a multiplier coefficient $1/\sigma_{M-i}$, representing the element M-i of the matrix $\Sigma^{-1}$ of the Cholesky decomposition. The multiplier circuits 2 deliver the product $p_i = z_i/\sigma_{M-i}$.

A subtracter circuit 3 is provided, which receives, on the one hand, the product $p_i$ and, on the other hand, a signal $q_i$, the sum of all the earlier decided information symbols with $q\in[1,L']$, a relation in which $L'$ is at most equal to L, the length of the memory of the channel in number of transmitted symbols, weighted by the corresponding element $H_{M-i,M-i+q}$ of the matrix H of the Cholesky decomposition. The subtracter circuit 3 delivers a decision signal $s_i$.

Following the subtracter circuit 3 there is provided a threshold comparator circuit 4, which receives the previously cited decision signal $s_i$, and delivers the corresponding decided information symbols signal .

At the output of the threshold comparator circuit 4 there is provided a feedback loop 5 receiving the decided information symbols signal . This feedback loop comprises, on the one hand, a circuit weighting the earlier decided information symbols signals to by the corresponding elements $H_{M-i,M-i+q}$ and, on the other hand, a circuit 51 summing the products $H_{M-i,M-i+q}$. , with $q\in[1,L']$. The summing circuit 51 delivers the signal $q_i$ at the subtraction input of the subtractor circuits 3.

Of course, the Cholesky decomposition is formulated from the expression for the noise covariance matrix R of the transmission channel, as described previously in the description.

Figure 4:
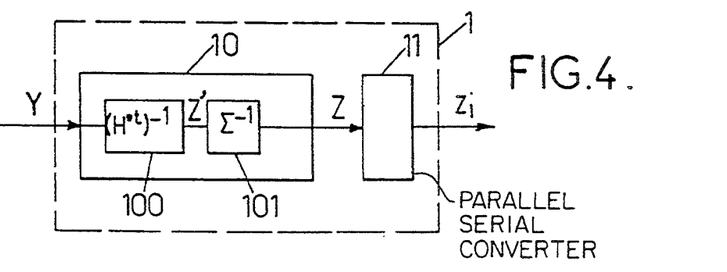
FIG. 4 represents an embodiment detail of a component noise-whitening module of the decision feedback equaliser device such as represented in FIG. 3.

In a preferred embodiment of the device which is the subject of the present invention, as represented in FIG. 3, the noise-whitening circuits 1 can include a noise-whitening module proper 10 followed by a circuit, denoted 11, for parallel/serial conversion of the samples, and which makes it possible to deliver the successive whitened-noise samples $z_i$. The latter circuit, or parallel/serial conversion module 11, can consist of a conventional type circuit and, for this reason, will not be described in detail. The module 10 for the whitening of the noise proper of the observation samples can then include, as represented in FIG. 4, a matrix multiplier circuit 100, with transfer function $(H^{*t})^{-1}$ receiving the observation vector Y and delivering the vector $Z'=(H^{*t})^{-1}.Y$, a relation in which "$t$" indicates a transposition operator.

Furthermore, the matrix multiplier circuit 100 is followed by a matrix multiplier circuit 101 with transfer function $\Sigma^{-1}$ receiving the aforesaid vector $Z'$ and delivering the vector $Z-\Sigma^{-1}.Z'$. The vector Z thus corresponds to a whitened-noise observation vector formed from whitened observation samples $z_i$. Of course, the parallel/serial conversion module 11 then makes it possible to deliver the whitened observation samples in succession.

As regards the matrix multiplier modules 100 and 101, it will be noted that the latter consist for example of corresponding numerical calculating modules. These calculating modules can be, either logic modules, or reprogrammable modules of memory type, for example.

Thus as has been furthermore represented in FIG. 3, the weighting circuit 50 forming the feedback loop 5 includes at most a plurality of L delay cells 500, each delay cell being denoted $500_{i-q}$ and affording a delay by a period T, T designating the duration between two successive information symbols. The delay cells are connected in cascade, the input of the first delay cell receiving the decided information symbol and the output of each successive delay cell of rank q delivering respectively the earlier decided symbols with $q\in[1,L']$.

Furthermore, the weighting circuit 50 comprises at most a plurality of L multiplier circuits 501, which each bear the reference $501_{i-q}$. Each multiplier circuit of rank q has a corresponding input connected as output of the delay cell of rank q and a second input receiving a multiplier coefficient, denoted $H_{M-1,M-i+q}$, corresponding element of the matrix H of the Cholesky decomposition.

The output of each multiplier 501 of rank q then delivers the product $H_{M-i,M-i+q}$. , and is connected to an input of the summing circuit 51 which constitutes, together with the weighting circuit 50, the feedback loop 5.

The threshold comparator 4 can consist of a circuit for calculating and minimising the Euclidean distance between the decision signal $s_i$ delivered by the subtracter circuit 3 and the symbol $d_i$ of the alphabet of corresponding symbols. The alphabet of symbols is held in a corresponding dictionary file.

The threshold comparator circuit 4 then carries out the decision function:

$$= argmin\ |s_i - d_i|.$$

It is of course understood that the operation of minimising the value of the Euclidean distance $|s_i - d_i|$ is performed on all the symbols $d_i$ of the corresponding alphabet.

The mode of operation of the equaliser device which is the subject of the present invention such as represented in FIGS. 3 and 4 is as follows:
the expression for the whitened-noise sample vector Z can be written:

$$Z = \Sigma.H.D + V \text{ with } V = (H^{*t}.\Sigma)^{-1}.U.$$

The covariance matrix of the noise V is also $2N_0 I$.

With the transformation H being causal, the decision regarding a symbol $d_i$ can be undertaken from the decisions regarding the earlier symbols alone in a manner similar to that undertaken in the prior-art equalisers of the type described previously in the description.

An essential difference between the equaliser which is the subject of the present invention and the prior-art equalisers is that the coefficients of the filter constituted by the feedback loop 5 are, in the context of the equaliser which is the subject of the present invention, variables over time, in value and in number.

Of course, as in the case of the prior-art equaliser devices, it is assumed that the decisions regarding the earlier symbols are correct. In such a case, their interference can then be subtracted from the product $p_i = -z_i/\sigma_{m-i}$ to obtain the decision signal $s_i$. The decision, that is to say the decided symbol , is then obtained from the decision signal $s_i$ through the threshold comparator 4. In the embodiment of the equaliser which is the subject of the present invention, such as represented in FIG. 3, the weighting circuit 50 and the summing circuit 51 in fact constitute a transverse filter, the values and number of coefficients of which vary with the temporal index i, $L' = \min(i-1, L)$.

It is understood that the relation giving the value of the vector Z of the whitened-noise samples in connection with the whitened noise V then makes it possible to obtain a set of relations in which the relation of order M can be written:

$$s_i = z_1/\sigma_{M-1} = d_1 + v_1/\sigma_{M-1}.$$

The decision regarding $d_1$ minimises the Euclidean distance between $s_1$ and $d_1$, that is to say:

$$d_i = \underset{\{d\}}{\text{argmin}} |s_1 - d_1|$$

where the minimum is sought within the alphabet $\{d\}$ of symbols. The other relations can be written:

$$s_i = z_i/\sigma_{M-i} - \sum_{k=1}^{L'} H_{M-i,M-i+k} \cdot d_{i-k}$$

where
$i = 2, 3, \ldots, M$ and $L' = \min(i-1, L)$.

$$d_i = \underset{\{d\}}{\text{argmin}} |s_i - d_i|$$

$$s_i = d_i + \sum_{k=1}^{L'} H_{M-i,M-i+k}(d_{i-k} - d_{i-k}) + v_i/\sigma_{M-i}$$

With the assumption of correct decisions, $d_{i-k} = $, for $k < i$, this last relation becomes:

$$s_i = d_i + v_i/\sigma_{M-i}$$

The operating mode of the equaliser which is the subject of the present invention such as described previously in connection with FIGS. 3 and 4 is more particularly designated by the name of decision feedback equaliser for block transmission of zero forcing type, or ZF-BDFE.

A variant embodiment of the equaliser which is the subject of the present invention will be described in connection with FIG. 5.

In the aforesaid figure, there has in fact been represented a variant embodiment of the noise-whitening module 10 allowing the implementation of a decision feedback equaliser for block transmission with minimum mean square error.

This embodiment is more advantageous. It consists in replacing the noise covariance matrix R by a matrix dubbed R' which is linked to R by the relation $$R' = [R + aI],$$

where I is the identity matrix and a is a positive constant. Its best value is $$\frac{2N_0}{E(|dk|^2)}$$

The matrix R' has the advantage of taking into account the presence of the noise and of having a narrower spread of eigenvalues than does R.

The basic plan for MMSE-BDFE is the same as that for ZF-BDFE. The sole difference consists in replacing R with R'. Accordingly, the elements of the matrices $\Sigma$ and H cited above must be replaced with those of $\Sigma'$ and H', respectively, as represented in FIG. 5, where $\Sigma'$ and H' are obtained through the following Cholesky decomposition:

$$R' = H'^{*t} . \Sigma'^2 . H'$$

In the preceding relations, $2N_0$ represents the baseband noise power spectral density, $E(|dk|^2)$ represents the mathematical expectation of the modulus of the symbol $dk^2$, itself representative of the energy of the corresponding symbol $|dk|$, I represents the identity matrix.

Figure 5:
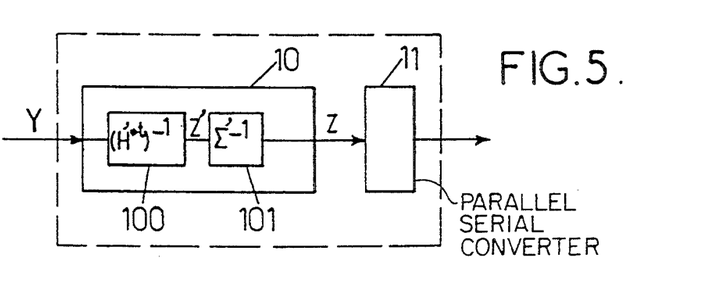
FIG. 5 represents an advantageous non-limiting variant embodiment of the noise-whitening module such as represented in FIG. 4.

This embodiment, such as represented in FIG. 5, corresponds to a block decision feedback equaliser with minimum mean square error, designated in short by the notation MMSE-BDFE.

Figure 6:
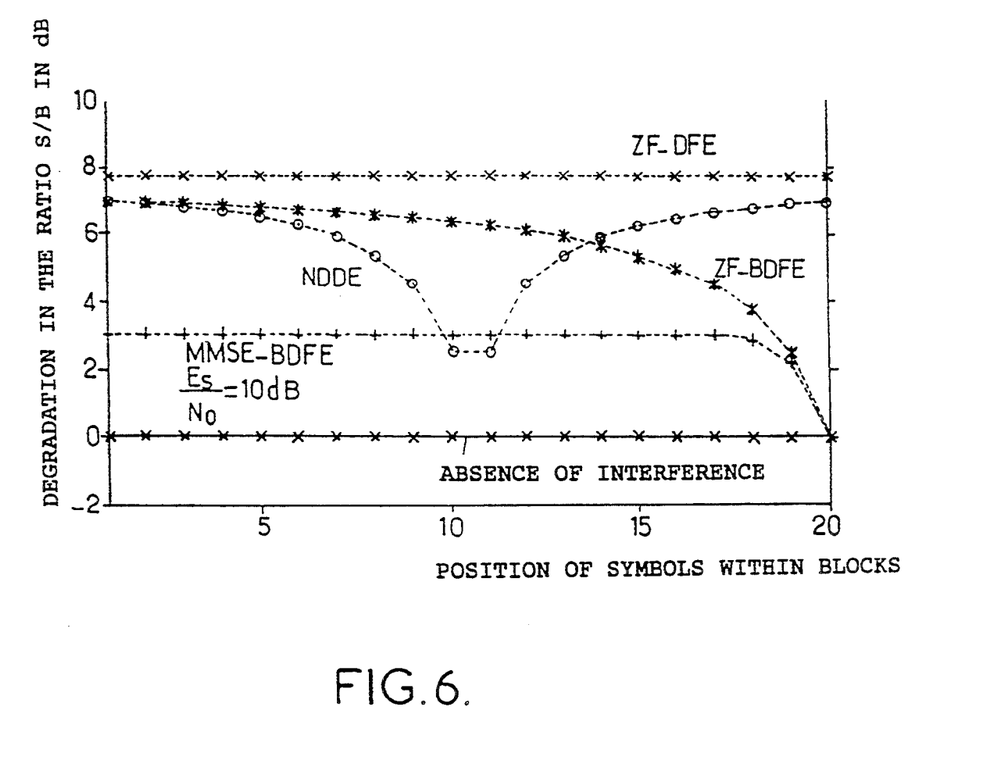
FIG. 6 represents a plot comparing the values of the signal-to-noise ratio obtained following the implementation of the prior techniques and of the method which is the subject of the present invention, as a function of the position of the symbol in the relevant symbol block.

In FIG. 6 has been represented respectively the degradation in the signal-to-noise ratio S/B in dB, on the one hand, for various prior-art equalisers, such as the (zero-forcing type) conventional DFE equaliser, the equaliser of NDDE type, previously mentioned in the description, and, on the other hand, the degradation in the signal-to-noise ratio S/B in dB for an equaliser in accordance with the subject of the present invention, respectively of ZF-BDFE type and then of MMSE-BDFE type.

It is seen that the value of the signal-to-noise ratio is reduced as a function of the position or rank of the information symbols within the blocks. The aforesaid diagrams have been plotted, for a given channel, for blocks containing 20 information symbols. The ZF-BDFE type equaliser according to the invention has identical performance to that of the NDDE type equaliser for half the symbols, whilst the M/2 remaining symbols have a smaller error probability when the ZF-BDFE type equaliser according to the invention is used. In FIG. 6 it is seen also that in the case of a MMSE-BDFE type equaliser according to the invention, the performance is furthermore improved by comparison with the ZF-BDFE type zero-forcing variant. These types of equalisers which are the subject of the invention also exhibit improved performance by comparison with the conventional DFE equalisers.

There has thus been described a decision feedback equaliser device and method for the block transmission of information symbols, which is particularly powerful insofar as, whereas the conventional equalisers use transverse filters, the method and the equaliser device which are the subject of the present invention on the contrary use particularly powerful matrix multiplier operators. Given that the impulse response of the channel, or an estimate of it, is available, in real time, the coefficients of the equaliser device which is the subject of the present invention, that is to say the coefficients of the matrices or matrix operators used, are determined easily by using for example the Schur algorithm as mentioned previously. This makes it possible to reduce by a significant factor, equal to at least M/6, the complexity of the device while improving its performance.

I claim:

1. A decision feedback equaliser method for the block transmission of information symbols over a variable distorting channel, in the presence of noise and of inter-symbol interference, the transmission being performed in data symbol blocks interleaved with reference symbol blocks and the detection of these symbols being performed at a receiving end, from an observation vector formed from observation samples, wherein said method comprises performing, at said receiving end, in succession:

a whitening of noise affecting received observation samples, in order to generate successive whitened-noise observation samples, said whitening of noise being performed using a Cholesky decomposition formulated from the expression for the noise covariance matrix R of the transmission channel of the form:

$$R = H^{*t}.\Sigma^2.H$$

wherein

H is a triangular matrix having a main diagonal, the elements of the main diagonal being equal to one, "$t$" indicating transposition and "*" the conjugate matrix, and wherein $\Sigma$ is a diagonal matrix of positive real elements, $\Sigma_{ii} = \sigma_i$, $\sigma_i^2$ representing mean power of a prediction error obtained from a predictor of order i, with i$\epsilon$, M designating the number of information symbols in a block; and detecting a current symbol on the basis of detections of earlier decided symbols, from said whitened-noise observation samples, thus enabling a decision to be made regarding said current symbol from at least one earlier decided symbol so as to generate a decided symbol representative of said current symbol.

2. Decision feedback equaliser device for the block transmission of information symbols ( ) over a variable distorting channel, said transmission of said information symbols being performed in the form of data blocks containing M information symbols interleaved with blocks of N reference symbols, detection of said information symbols being performed from an observation vector $Y = (Y_M, Y_{M-1}, \ldots, Y_i, \ldots, Y_1)^t$ formed from observation samples $Y_i$ obtained at the receiving end, wherein said equaliser device comprises:

means for whitening the noise affecting received observation samples, $Y_i$, and for delivering, by Cholesky decomposition, successive whitened-noise observation samples $z_i$ of rank i;

multiplier means receiving, on the one hand, said whitened-noise observation samples $z_i$, and, on the other hand, a multiplier coefficient $1/\sigma_{M-1}$, representing the element M-i of the matrix $\Sigma^{-1}$ of the Cholesky decomposition, said multiplier means delivering the product $p_i = z_i/\sigma_{M-i}$;

a subtractor receiving, on the one hand, said product $p_i$ and, on the other hand, a signal $q_i$, the sum of all the earlier decided information symbols with q$\epsilon$(1,L'),L' being at most equal to L, L designating the duration of a memory of the channel in number of transmitted symbols, weighted by the corresponding element $H_{M-i,M-i+q}$ of the matrix H of said Cholesky decomposition, said subtractor delivering a decision signal $s_i$;

a threshold-comparator receiving said decision signal $s_i$ and delivering the decided information symbols signal  ; and a feedback loop receiving said decided information symbols signal  comprising, on the one hand, a multiplier circuit weighting the earlier decided information symbols signal  to  by said corresponding elements $H_{M-i,M-i+q}$ and, on the other hand, a summing circuit summing products $H_{M-i,M-i+q}$. , with q$\epsilon$(1, L'), said summing circuit delivering said signal $q_i$ at the subtraction input of said subtractor.

3. Detector device according to claim 2, wherein said Cholesky decomposition being formulated from the expression for the noise covariance matrix R of the transmission channel in the form:

$$R = H^{*t}.\Sigma^2.H$$

where

H is a triangular matrix, elements of the main diagonal of which are equal to one, "$t$" indicating transposition and "*" the conjugate matrix, $\Sigma$ is a diagonal matrix of positive real elements $\Sigma_{ii} = \sigma_i.\sigma_i^2$ representing mean power of a prediction error obtained from a predictor of order i, with i$\epsilon$\{0,1, \ldots, M$-$1\}, said means for whitening the noise of said observation samples include:

matrix multiplier $(H^{*t})^{-1}$ means receiving said observation vector Y and delivering the vector $Z' = (H^{*t})^{-1}.Y$, "$t$" indicating a transposition operator;

matrix multiplier $\Sigma^{-1}$ means receiving said vector Z' and delivering the vector $Z = \Sigma^{-1}.Z'$, the vector Z corresponding to a whitened-noise observation vector formed from said whitened observation samples $z_i$; and means for parallel/serial conversion making it possible, from the M whitened-noise observation samples $z_i$ delivered in parallel by said matrix multiplier means $\Sigma^{-1}$, to deliver said successive whitened-noise observation samples $z_i$.

4. Device according to claim 3, wherein said Cholesky decomposition is formulated from the expression for the matrix R' satisfying the relations $$R' = [R + aI]$$

where I is the identity matrix and a is a positive constant, dependent on the expression $$\frac{2N_o}{E(|dk|^2)}$$

in the form $$R' = H'^{*t}.\Sigma'^2.H'$$

the matrices H' and $\Sigma'$ being substituted for the matrices H and $\Sigma$ respectively and of the same nature as the latter, a relation in which:

$2N_o$ represents the baseband noise power spectral density, $E(|dk|^2)$ represents the mathematical expectation of the modulus of the symbol dk squared, representative of the energy of the corresponding symbol dk.

5. Device according to claim 2, wherein said weighting circuit forming the feedback loop comprises:

a plurality of L cells, connected in cascade, for delaying by a period T, T denoting the duration between two successive information symbols, the input of the first delay cell receiving the decided information symbol  and the output of each successive delay cell of rank q delivering respectively the earlier decided symbol  with q$\epsilon$\{1,L'\}; and a plurality of L multiplier circuits, a multiplier circuit of rank q having a first input connected at the output of the corresponding delay cell of rank q and a second input receiving a multiplier coefficient $H_{M-1,M-1+q}$ corresponding element of the matrix H of said Cholesky decomposition, the output of each multiplier of rank q delivering the product $H_{M-i,M-i+q}$  being connected to an input of said summing circuit forming said feedback loop.

6. Device according to claim 2, wherein said threshold comparator means consists of a circuit for calculating and minimising the Euclidean distance between the decision signal $s_i$ and the symbol $d_i$ of the corresponding alphabet:

$$d_i = \mathop{\mathrm{argmin}}_{\{d\}} |s_i - d_i|.$$

* * * * *

UNITED STATES PATENT AND TRADEMARK OFFICE
CERTIFICATE OF CORRECTION

PATENT NO. : 5,436,929  
DATED : July 25, 1995  
INVENTOR(S) : Kawas Kaleh

It is certified that error appears in the above-indentified patent and that said Letters Patent is hereby corrected as shown below:

Column 3, line 57, after "signal" insert -- $\hat{d}_i$ --;

line 58, after "signal" insert -- $\hat{d}_i$ --;

line 60, after "signals" insert $\hat{d}_{i-1}$ ; after "to" insert -- $\hat{d}_{i-q}$ --;

line 62, after "$H_{M-i,M-i+q}$." insert -- $\hat{d}_{i-q}$ --;

Column 5, line 52, after "symbol" insert -- $\hat{d}_i$ --;

line 68, change "$\epsilon$" to --$\Sigma$--;

Column 7, line 4, after "symbols" insert -- $\hat{d}_{i-q}$ --;

line 16, after "signal" insert -- $\hat{d}_i$ ;

line 18, after "signals" insert $\hat{d}_{i-1}$ ; after "to" insert -- $\hat{d}_{i-q}$ --;

UNITED STATES PATENT AND TRADEMARK OFFICE
CERTIFICATE OF CORRECTION

PATENT NO. : 5,436,929
DATED : July 25, 1995
INVENTOR(S) : Kawas Kaleh

It is certified that error appears in the above-indentified patent and that said Letters Patent is hereby corrected as shown below:

Column 7, line 20, after "$H_{M-i,M-i+q}$." insert -- $\hat{d}_{i-q}$ --;

line 65, after "symbol" insert -- $\hat{d}_i$ --;

line 67, after "symbols" insert -- $\hat{d}_{i-q}$ --;

Column 8, line 10, after "$H_{M-i,M-i+q}$." insert -- $\hat{d}_{i-q}$ --;

line 23, before "=" insert -- $\hat{d}_i$ --;

line 54, after "symbol" insert -- $\hat{d}_i$ --;

Column 9, line 7, delete "$d_i$" and insert therefor -- $\hat{d}_i$ --;

line 13, delete "di-k" and insert therefor -- $\hat{d}_{i-k}$ --;

line 20, delete "$d_i$" and insert therefor -- $\hat{d}_i$ --;

line 26, after "=" insert -- $\hat{d}_{i-k}$ --;

UNITED STATES PATENT AND TRADEMARK OFFICE
CERTIFICATE OF CORRECTION

PATENT NO. : 5,436,929
DATED : July 25, 1995
INVENTOR(S) : Kawas Kaleh

It is certified that error appears in the above-indentified patent and that said Letters Patent is hereby corrected as shown below:

Column 11, line 15, delete "i$\epsilon$, M" and insert therefor -- $i \in [0, 1,...,M-1]$, $M$ -- line 25, after "symbols" -- $\hat{d_i}$ --;

line 46, after "symbols" insert -- $\hat{d}_{i-q}$ --;

line 55, after "signal" insert -- $\hat{d_i}$ --;

line 57, after "signal" insert -- $\hat{d_i}$ --;

line 59, after "signals" insert $\hat{d}_{i-1}$ ; after "to" insert -- $\hat{d}_{i-q}$ --;

lines 61 and 62, after "$H_{M-i,M-i+q}$." insert -- $\hat{d}_{i-q}$ --;

UNITED STATES PATENT AND TRADEMARK OFFICE
CERTIFICATE OF CORRECTION

PATENT NO. : 5,436,929
DATED : July 25, 1995
INVENTOR(S) : Kawas Kaleh

It is certified that error appears in the above-indentified patent and that said Letters Patent is hereby corrected as shown below:

Column 12, line 57, after "symbol" insert -- $\hat{d}_i$ --;

line 59, after "symbol" insert -- $\hat{d}_{i-q}$ --;

lines 66 and 67, after "$H_{M-i,M-i+q}$" insert -- $\cdot\ \hat{d}_{i-q}$ --;

Column 14, line 3, change "$d_i$" to read -- $\hat{d}_i$ --;

Signed and Sealed this

Eighteenth Day of June, 1996

BRUCE LEHMAN

Attest:

Attesting Officer

Commissioner of Patents and Trademarks